United States Patent [19]

Parra

[11] Patent Number: 4,932,778
[45] Date of Patent: Jun. 12, 1990

[54] AUTOKINESIS FREE OPTICAL INSTRUMENT

[75] Inventor: Jorge M. Parra, New Port Richey, Fla.

[73] Assignee: Pioneer Data Processing, Inc., Holiday, Fla.

[21] Appl. No.: 387,906

[22] Filed: Aug. 1, 1989

Related U.S. Application Data

[63] Continuation-in-part of Ser. No. 64,419, Jun. 22, 1987, abandoned.

[51] Int. Cl.$^5$ ............................................. G01C 9/02
[52] U.S. Cl. ........................................ 356/247; 33/241
[58] Field of Search .................. 356/247, 251, 252; 33/241

[56] References Cited

FOREIGN PATENT DOCUMENTS 2154018 8/1985 United Kingdom ................ 356/247

OTHER PUBLICATIONS

"Self-Luminous Iron Sight Inseats & Rifle Scopes", Armson.

*Primary Examiner*—Vincent P. McGraw
*Assistant Examiner*—S. A. Turner
*Attorney, Agent, or Firm*—Kline, Rommel & Colbert

[57] ABSTRACT

An optical instrument has a low powered light point source mounted on a tube for orienting light point source along a predetermined viewing axis for one eye of an observer. An optical void surrounds the point light source, including the tube. The light point source is coherent and/or collimated so as to be substantially free of autokinesis effects. The tube is mounted on orientable support structure for the predetermined viewing axis for one eye of an observer whereby when said observer is viewing a scene through his other eye an optically fused image is presented to the observer with said predetermined viewing axis including the point in said scene wherein said point source appears.

25 Claims, 3 Drawing Sheets

EYE #1 SCENE
(EYE #2 CLOSED)

EYE #2 SCENE
(EYE #1 CLOSED)

OPTICALLY FUSED SCENE
(BOTH EYES OPEN)

AUTOKINESIS FREE OPTICAL INSTRUMENT

REFERENCE TO RELATED APPLICATION

This application is a continuation-in-part of my application Ser. No. 064,419 filed June 22, 1987 for "OPTICAL INSTRUMENT", and now abandoned.

BACKGROUND AND BRIEF DESCRIPTION OF THE INVENTION

The present invention relates to autokinesis free optical instruments for binocular visioned people which is substantially free of autokinesis effects and useful for various applications such as surveying, sighting and orienting.

In some prior art aiming systems, an illuminated bright red dot on a jet black background is viewed through one eye of a binocular visioned person and the other eye views the target scene. The human brain fuses these two optical images and causes the dot to appear on the target. However, such devices do not take into account the autokinesis phenomena whereby a point of light on a black background will appear to drift or move when it is viewed for a few seconds. In one commercial gun sight device of this character, the spot of light appears to start to drift and a long concentrated aim is not feasible. In that device, ambient light was collected by a plastic member to form a bright red dot on a black background.

Laser or coherent light sources have been increasingly used in surveying an various optical sighting and orienting systems. These typically involve a high power laser projecting light upon a distant target and require certain protective measures to avoid damage to the human eye. Moreover, the laser beam expands in diameter with distance. When used for gun sighting, the laser beam provides a path to the sighting device. In other sighting applications various forms of lighted reticles are used such as in optical instruments where the illuminated reticle is superposed on the image of a scene, such as a target in which the illuminated reticle is viewed. In such systems, one eye is closed and the scene with the superposed reticle superposed thereon is viewed through the one open eye. In other systems such as in photogrammatic stereoplotters, periscopes, etc., a light spot reticle is optically added to a stereo scene, either directly or indirectly through half-silvered mirrors, prisms, etc.

The present invention is substantially free of autokinesis effects and depends on the phenomena of the human brain which fuses images viewed by one eye with images viewed by the other eye. It uses a collimated, monochromatic, coherent light spot superposed upon the image of a scene viewed through the other eye. In a preferred embodiment, a low powered light point source of visible coherent radiation having a wavelength in the range of 200-900 NM (nanometer), and 660 NM has been found to be very useful, collimated and surrounded by an optical void (as defined herein, an optical void is a black, neutral or "non-visible" background immediately surrounding the collimated point light source). This arrangement substantially excludes from vision in one eye all objects in the target area except the collimated light point source of visible monochromatic radiation. In this context, it is not required that the observer's eye be positioned directly on the instrument to exclude the remainder of the scene from the normal field of vision of the eye that is viewing the point light source. The optical void can be created by locating the collimated, coherent light point source of visible monochromatic radiation having a wavelength in the range referred to above, in a tubular body member which is internally coated with rediation absorbent material such as a black paint or an otherwise non-reflective coating. In some cases, there can be a halo effect created by an incomplete optical void which can help to locate the point light source for the observer. In a preferred embodiment, the point light source is circular and about 1 mm in diameter.

When a scene is observed using the one eye (with or without magnification) and the other eye of an individual is viewing the collimated light point source of visible monochromatic radiation, due to the optical fusion property of the human brain, the point light source appears centrally in the fused scene and is substantially free of autokineses effects.

The term "low power" is meant a light source which does not require protective measures for the eye. The combination of high power sources with some form of energy attenuation effected prior to forming the point light source is also encompassed by this term. Typical coherent light producing PN junction diodes or coherent optoelectronic light sources useful in the practice of this invention operate in the under 100 milliwatt range.

When the coherent, collimated light point source is mounted on an orientable support structure, such as surveyor's transit tripod and leveling structure, and plumbed and leveled in the same fashion as plumbing and leveling a surveyor's transit, and the coherent, collimated light point source is viewed through one eye and the other eye views the scene, the coherent, collimated light point source which has been leveled is fused into the scene viewed, by the other eye. A stadia rod, for example, will have the light spot positioned at a precise target point and the normal measurements are made. This results in a higher degree of measurement accuracy than the best available optical level, and at longer ranges. When mounted on a rifle, for example, and the collimated light source has its axis oriented with the axis of the rifle barrel, and the target viewed with one eye, wherever the light spot appears in the fused scene, the axis of the rifle barrel is oriented precisely with the position of the light spot at the target. The system of this invention is impervious to working conditions (condensation, rising thermal waves) and variable light conditions. It has lower instrument costs, minimal power and weight requirements, and is simpler to use and has a range limited only by line of vision. There is no difference in whether the observer has corrective lenses (glasses, contact lenses, tinted, etc.) or not.

In the preferred embodiment, a 660 NM wavelength produces optimal visual fusion of the two images. The optical void or black surround enhances the visual fusion of the two images. In addition, the red band has less permanency on the human retina. Moreover, in many surveying, aircraft landing systems, etc., the backgound is predominantly green or another background color on which the "red band" light stands out more prominently. While the 660 NM wavelength coherent point light source has been found to be most prefereble, it is to be understood the broader aspects of the invention encompass other wavelengths.

In other sighting situations, when the device is mounted on an orientable support surface, such as a light on a particular landing spot (in the scene viewed by the other eye) and by maintaining the spot of light on that point through maneuvering of the helicopter aircraft, effect a proper and safe landing.

Thus, the present invention provides an improved optical sighting instrument which requires the use of two eyes and the optical fusion property of the human brain and is substantially free of autokinesis effects. In comparison with the best optical level, for example, it results in:
(1) greater accuracy,
(2) impervious to:
 (a) condensation,
 (b) rising thermal waves,
 (c) full functions under various light conditions,
(3) minimal power requirements,
(4) range limited only by line of sight,
(5) simpler to use,
(6) minimal adjustments previous to use.

The orientable support referred to above can be a surveyor's instrument base, such as a transit, level, etc., aircraft (fixed and rotary wing), weapon (rifles, pistols, rocket launchers, cannons, etc.), pelorus (also known as an astrolobe or ship's transit and used for maritime navigation) telescopes (used for spotting purposes for large astronomical telescopes, both optical and radio), television cameras and the like. This listing is not intended to be exclusive, but, rather, is exemplary of the wide fields of uses of this invention.

BRIEF DESCRIPTION OF THE DRAWINGS

The above and other objects, advantages and features of the invention will become clearer when considered with the following specification and accompanying drawings wherein.

DETAILED DESCRIPTION OF THE INVENTION

Figure 1:
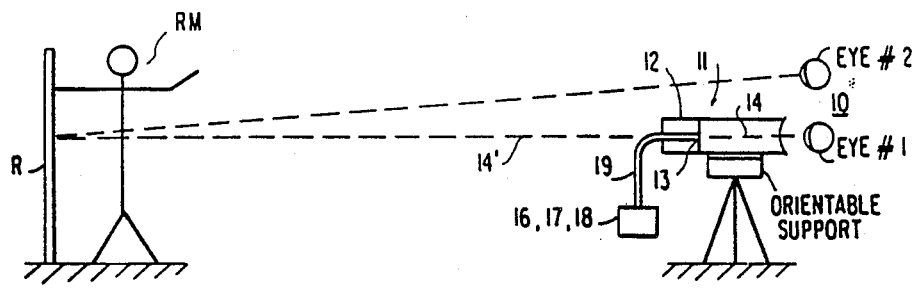
FIG. 1 is a diagrammatic illustration of a surveying scene using a level transit incorporating the invention.
Figure 2:
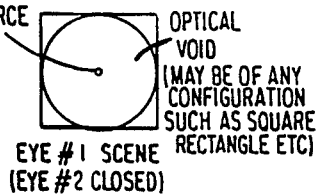
FIG. 2 is the scene viewed by eye No. 1 of FIG. 1.
Figure 3:
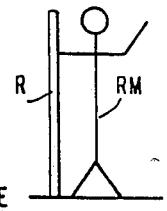
FIG. 3 is the scene viewed by eye No. 2 viewing in the sighting instrument incorporating the invention.
Figure 4:
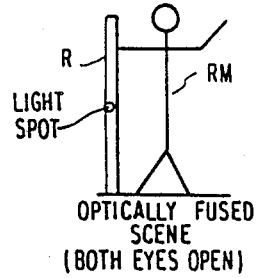
FIG. 4 is the scene viewed by eye No. 1, and eye No. 2 as optically fused by the brain.

Referring now to FIG. 1, which depicts a scene in surveying, a rod man RM is shown holding a stadia rod R. The eyes 10 of the surveyor or engineer are designated as eye No. 1 and eye No. 2, it being appreciated that eye No. 1 can be the left or right eye of the observer and the same with eye No. 2. An optical instrument 11, incorporating the invention has a sighting tube 12 and a source of collimated light 13 positioned along the viewing axis 14 at one end of sighting tube 12. Several embodiments of the sighting tube and its component parts are disclosed in FIGS. 5, 6 and 7. In the embodiment shown in FIG. 5, instrument 11 includes a source of coherent monochromatic light 15 constituted by a low power source of monochromatic radiation, such as PN junction diode 16 which is energized by battery 17 through switch 18. A fiber optic wave guide or optical wire 19 has one end 20 adapted to receive coherent light energy 21 from junction diode 16 and convey same to end 22 (which preferably is squared or normal to the optical or light spot viewing axis 14) which is located along the light spot viewing axis 14 of instrument 11. In a preferred embodiment, the area 24 immediately surrounding the end 22 of the fiber optic element 19 is formed as an optical void and, preferably, is coated with a light absorbent substance such as a flat or matte black coating material 27. In a preferred embodiment, the end 22 of fiber optic wave guide 19 has a diameter of about one (1) millimeter. Fiber optic wave guide 19 and hollow centering member 28 and passage 28' serve as a collimator for the light rays emitted by PN junction diode 16. In a preferred embodiment, the length of the fiber optic element is between about 1 and about 5 meters. An eye piece 29 which may be a lens, constitutes an eye alignment device which assists the surveyor observer in aligning eye No. 1 with the predetermined viewing axis 14. The alignment device shown in FIG. 7(a) is a centrally located peforation 30(a) which is coaxial with viewing axis 14 and of approximately the same diameter as the light spot at end 22 of fiber optic wave guide 19. In FIG. 7(b), the alignment indicia are silk-screened cross-hair or fiducial markings 30b, with the central portions omitted to permit the light spot to be observed more clearly. In FIG. 7c, a circle 30(c) is engraved with the center aligned with the predetermined viewing axis 14 of the light spot at the end 22 of the fiber optic wave guide 19. Finally, in FIG. 7d, the element is constituted by a plain glass plate and the whole diameter of the element is used for alignment. The alignment device of FIG. 7d is particularly for use with the aircraft landing embodiments shown in FIGS. 8 and 9 where the pilot's eye No. 1 will be spaced further from the end and the measurement precision of surveying is not required.

Figure 5:
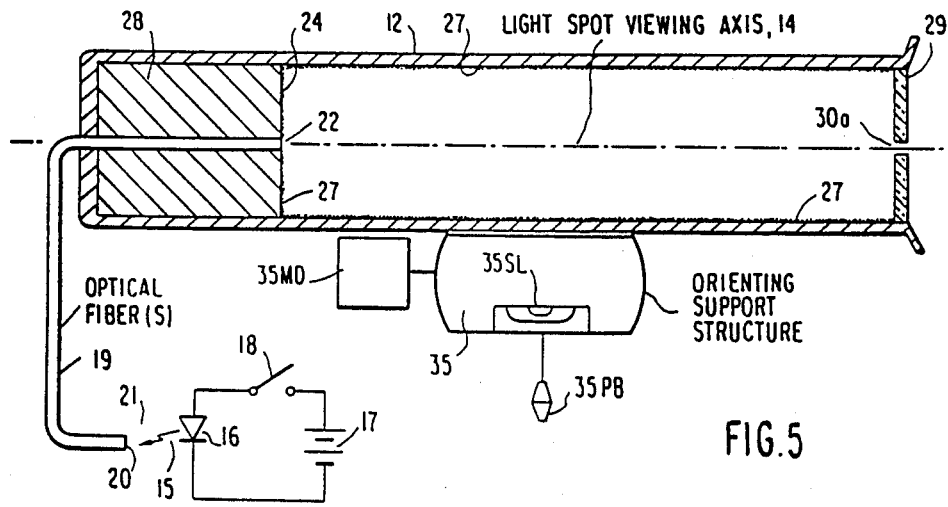
FIG. 5 is a partial sectional and schematic view of an instrument incorporating the invention.

As shown in FIG. 5, the orienting support structure 35, may be the leveling and plumbing portions of a surveyor's level, transit or theodolite, etc., which has a plumb bob 35PB and spirit, level or bubble level 35SL and supported by a tripod or other ground engaging structure. The measurement devices diagrammatically illustrated at 35MD are the usual angle reading instruments and may be mechanical or electronic with a microprocessor and liquid crystal, or other electronic displays.

Figure 6:
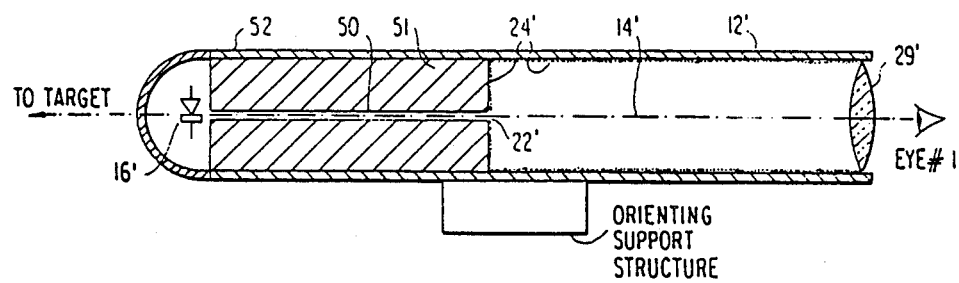
FIG. 6 is a partial sectional view of a further preferred embodiment of the invention, FIG. 7 are front elevational views of alignment devices to maintain axial accuracy of sighting along the axis of the light source and sighting tube.
Figure 7A:
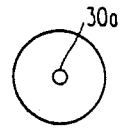
Figure 7B:
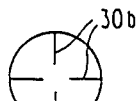
Figure 7C:
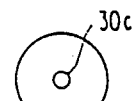
Figure 7D:
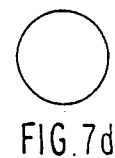

In the modified embodiment shown in FIG. 6, the point light source is formed by a coherent light emitting diode 16' at one end of a light collimating passage 50 in light collimator 51 mounted in the end 52 of tube 12'. The axis of collimating passage 50 is coaxial with the light spot viewing axis VA. The interior surfaces of tube 12' and collimator 51 are coated with a light abosorbent material 24' to create an optical void about the viewing axis VA. In this case, where no fiber optics are used, for optimal performance, and greater accuracy, the length of collimating tube or passage 50 should be the same as or greater in length then balance of tube 12'. Again, an alignment assisting device 29 (FIGS. 7a, 7b, 7c or 7d) may be used to assure alignment of the observer's eye No. 1.

Figure 8:
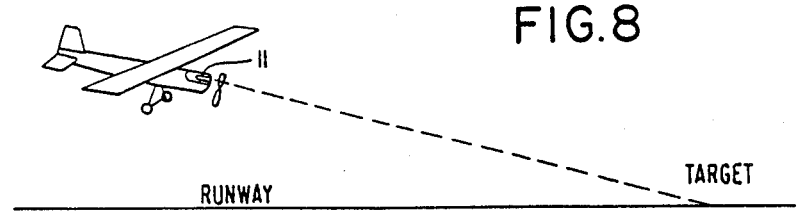
FIG. 8 is an illustration of the use of the invention to assist the pilot of an aircraft to land when there is no cross wind and situation of fog, haze, light rain, in which only one end of the runway is visible.
Figure 9:
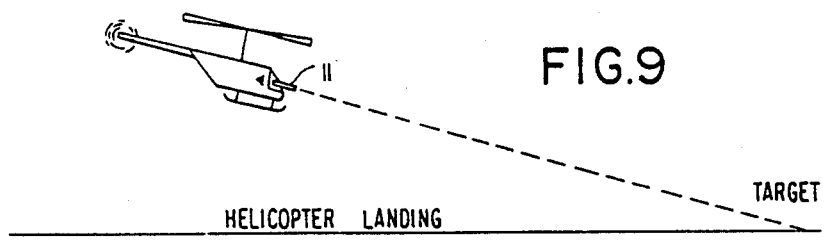
FIG. 9 is an illustration of the invention used to assist the pilot of a helicopter to land.

Referring now to FIG. 8, the instrument 11 is mounted on an adjustable mount and used for guiding the pilot to a landing spot target. By angularly adjusting the instrument 11 on its mounting to the crab angle required for any cross-wind, the pilot will be assisted in maintaining the glide path to the target spot at the end of the landing field. In FIG. 9, the instrument 11 is mounted on a helicopter to assist guiding the helicopter pilot to a landing spot.

It can also be used to assist in aiming guns, rockets and like armaments on the aircraft or on the ground.

Figure 10:
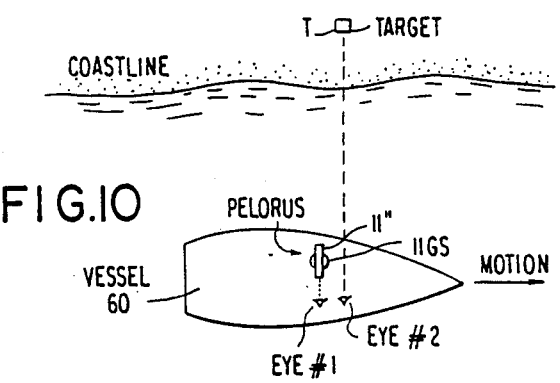
FIG. 10 is an illustration of the invention used with a pelorus in navigation.
Figure 11:
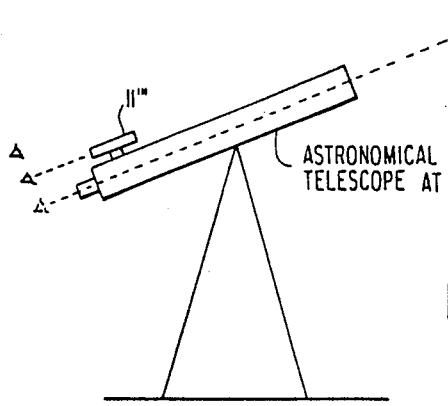
FIG. 11 illustrates the use of the invention as a spotting device for an astronomical telescope.

The instrument of this invention can also be used in navigation. As shown in FIG. 10, the instrument 11" is mounted on a gyroscopic stabilizer 11GS on a vessel 60 for making measurements relative to target T located along a shore or coastline and on an astronomical telescope AT in place of the usual spotting telescope.

In each of these embodiments, the collimated light spot is positioned (by moving the tube) on any selected target in the field of vision of eye No. 2 to thereby precisely orient the viewing axis VA with the selected target.

While the invention has been shown and described in relation to the preferred embodiments, it will be appreciated the various modifications and adaptations of the invention will be readily apparent to those skilled in the art and it is intended to encompass such modifications and adaptations within the spirit and scope of the claims appended hereto.

What is claimed is:

1. An optical instrument which is substantially free of autokinesis effects comprising:
   (1) a low power coherent light point source,
   (2) means for orienting said light point source along a predetermined viewing axis for one eye of an observer,
   (3) an orientable support structure,
   (4) means mounting said means for orienting on said orientable support structure for said predetermined viewing axis for one eye of an observer whereby when said observer is viewing a scene through his other eye an optically fused image is presented to said obsever with said predetermined viewing axis including the point in said scene wherein said point source appears.

2. The optical instrument defined in claim 1 wherein said low power coherent light point source is monochromatic light and has a wavelength from about 200 NM to about 900 NM and includes means for collimating the light.

3. The optical instrument defined in claim 2 wherein said low power coherent light point source has a wavelength of about 660 NM.

4. The optical instrument defined claim 1 wherein said coherent light point source has a diameter of 1 mm.

5. An optical instrument comprising:
   (1) a low power collimated light point source,
   (2) means forming an optical void surrounding said collimated light point source,
   (3) means for orienting said collimated light point source along a predetermined viewing axis for one eye of an observer,
   (4) a tubular member,
   (5) means mounting said low power collimated light point source at one end of said tubular member,
   (6) an alignment means at the opposite end of said tubular member of maintaining axial accuracy of the observer viewing along said predetermined axis,
   (7) an orientable support structure, and
   (8) means mounting said tubular member on said orientable support structure for said predetermined viewing axis for one eye of an observer so that when said obsever is viewing a scene through his other eye an optically fused image is presented to said observer with said predetermined viewing axis including the point in said scene wherein said collimated light point source appears.

6. The optical instrument defined in claim 5 wherein said low power collimated light point source is monochromatic light and has a wavelength from about 200 NM to about 900 NM.

7. The optical instrument defined in claim 6 wherein said low power collimated light point source as a wavelength of about 660 NM.

8. The optical instrument defined in claim 5 wherein said light point source has a diameter of about 1 mm.

9. The optical instrument defined in claim 5 wherein said alignment means includes a lens member, and means forming a reticle in said lens member which is aligned with said predetermined viewing axis.

10. The optical instrument defined in claim 5 wherein said light point source is a solid state PN junction device and issues monochromatic light.

11. The optical instrument defined in claim 10 including fiber optics wave guide means for conveying light from said PN junction device to a position aligned with said predetermined axis.

12. The optical instrument defined in claim 11 wherein said point light source has a wavelength in the range from about 200 NM to about 900 NM.

13. The optical instrument defined in claim 11 wherein said point light source has a wavelength of about 660 NM.

14. The optical instrument defined in claim 10 wherein said point light source has a dimension of about 1 mm.

15. The optical instrument defined in claim 6 wherein said low power light point source includes a solid state laser issuing monochromatic light.

16. The optical instrument defined in claim 6 wherein said low power monochromatic light point source includes a solid state laser for generating coherent light, and fiber optic means having an input and output ends for receiving light from said solid state laser to a position along said predetermined axis so that light appearing at said output end constitutes said monochromatic light point source.

17. A method of alignment a given axis of a device with a distant target by an observer having binocular vision, comprising,
   aligning a low powered collimated light point source, surrounded by an optical void and substantially free of autokinesis effects, along a predetermined viewing axis which is fixedly related to said given axis,
   viewing said distant target through one eye of said observer and said light point source through the other eye of said observer having binocular vision,
   orienting said device until said light point source presented to said one eye of said observer appears to be positioned on said target viewed through the other eye of said observer.

18. The method defined in claim 17 wherein said point light source has a wavelength in the range from about 200 NM to about 900 NM.

19. The method defined in claim 18 wherein said point light source has a wavelength of about 660 NM.

20. The method defined in claim 18 wherein said point light source is a solid state light emitting source.

21. A method of aligning a given axis of a device with a distant target by an observer having binocular vision, comprising, aligning a low powered visible coherent light point source having a diameter of about 1 mm, surrounded by an optical void and substantially free of autokinesis effects, along a predetermined viewing axis which is fixedly related to said given axis, viewing said distant target through one eye of said observer and said visible light source through the other eye of said observer having binocular vision, orienting said device until said light source presented to said one eye of said observer appears to be positioned on said target viewed through the other eye of said obsever.

22. The method defined in claim 21 wherein said low powered light source has a wavelength in the range from about 200 NM to about 900 NM.

23. The method defined in claim 22 wherein said low powered light source has a wavelength of about 660 NM.

24. The method defined in claim 22 wherein said point light source is a solid state light emitting source.

25. In a transit surveying instrument having a ground support frame, an orientable support structure, means mounting said orientable support structure on said ground support frame, and means mounting said optical sighting instrument on said orientable support structure, the improvement in said sighting instrument comprising:

(1) a low power autokinesis free light point source, (2) means forming an optical void surrounding said collimated light point source, (3) means for orienting said collimated light point source along a predetermined viewing axis for one eye of an observer, (4) a tubular member, (5) means mounting said low power collimated light point source at one end of said tubular member, (6) an alignment means at the opposite end of said tubular member for maintaining axial accuracy of the observer viewing along said predetermined axis, and (7) means mounting said tubular member on said orientable support structure for said predetermined viewing axis for one eye of an observer so that when said observer is viewing a scene through his other eye an optically fused image is presented to said observer with said predetermined viewing axis including the point in said scene wherein said collimated light point source appears.

* * * * *